United States Patent
Grilli et al.

(10) Patent No.: US 7,675,944 B2
(45) Date of Patent: Mar. 9, 2010

(54) METHOD AND SYSTEM FOR COMMUNICATING CONTENT ON A BROADCAST SERVICES COMMUNICATION SYSTEM

(75) Inventors: Francesco Grilli, San Diego, CA (US); Durga P. Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 715 days.

(21) Appl. No.: 11/386,122

(22) Filed: Mar. 20, 2006

(65) Prior Publication Data
US 2006/0209902 A1 Sep. 21, 2006

Related U.S. Application Data

(63) Continuation of application No. 10/226,059, filed on Aug. 21, 2002, now Pat. No. 7,016,327.

(51) Int. Cl.
*H04J 3/06* (2006.01)
(52) U.S. Cl. ............... 370/503; 370/331; 370/389
(58) Field of Classification Search .......... 370/503, 370/331, 335, 342, 509, 389; 340/7.43, 7.45; 714/755
See application file for complete search history.

(56) References Cited

U.S. PATENT DOCUMENTS

| 4,901,307 | A | 2/1990 | Gilhousen et al. |
|---|---|---|---|
| 4,907,307 | A | 3/1990 | Weitzler |
| 5,103,459 | A | 4/1992 | Gilhousen et al. |
| 5,504,773 | A | 4/1996 | Padovani et al. |
| 5,734,962 | A | 3/1998 | Hladik et al. |
| 5,751,725 | A | 5/1998 | Chen et al. |
| 5,774,496 | A | 6/1998 | Butler et al. |
| 5,883,888 | A | 3/1999 | St. Pierre |
| 5,999,816 | A | 12/1999 | Tiedemann, Jr. et al. |
| 6,134,440 | A | 10/2000 | Black |
| 6,256,300 | B1 | 7/2001 | Ahmed et al. |
| 6,263,204 | B1 | 7/2001 | Kusaki et al. |
| 6,300,864 | B1 * | 10/2001 | Willey ............ 340/7.43 |
| 6,574,211 | B2 | 6/2003 | Padovani et al. |
| 6,677,864 | B2 | 1/2004 | Khayrallah |
| 6,690,659 | B1 | 2/2004 | Ahmed et al. |
| 6,707,801 | B2 | 3/2004 | Hsu |
| 6,725,043 | B2 | 4/2004 | Bonta et al. |
| 6,731,936 | B2 | 5/2004 | Chen et al. |
| 6,754,495 | B2 | 6/2004 | Kusaki et al. |

(Continued)

OTHER PUBLICATIONS

International Search Report—PCT/US03/025623, International Search Authority—European Patent Office—Jun. 15, 2004.

(Continued)

*Primary Examiner*—Charles N Appiah
*Assistant Examiner*—Michael T Vu
(74) *Attorney, Agent, or Firm*—John J. Ketchum

(57) ABSTRACT

An outer decoder and an inner decoder encode a block of information to be transmitted, to improve protection by adding redundancy. The redundancy permits decoding of the information from less than a complete encoded block of information. Time re-alignment of two transmissions of the same content from two base stations can mitigate the problem of duplicated frames. The user of the subscriber station can experience seamless service without repetition of content, even when handing over to a new cell while receiving a buffer of broadcast content.

20 Claims, 8 Drawing Sheets

U.S. PATENT DOCUMENTS

| | | | |
|---|---|---|---|
| 6,765,896 | B1 | 7/2004 | Ahmed et al. |
| 6,771,670 | B1 * | 8/2004 | Pfahler et al. ............... 370/503 |
| 6,781,976 | B1 * | 8/2004 | Sonning et al. ............ 370/335 |
| 6,909,702 | B2 | 6/2005 | Leung et al. |
| 7,233,572 | B2 * | 6/2007 | Kim et al. .................. 370/236 |
| 7,317,697 | B2 | 1/2008 | Lewis et al. |
| 2002/0159482 | A1 | 10/2002 | Hans et al. |
| 2002/0178418 | A1 * | 11/2002 | Ramprashad et al. ....... 714/755 |
| 2003/0067893 | A1 * | 4/2003 | Dupuy et al. ............... 370/329 |

OTHER PUBLICATIONS

Agashe, P et al., "CDMA2000 High rate broadcast packet data air interface simulation results", Jul. 9, 2002, 3GPP2 TSG-C CDMA2000 Meeting, pp. 9, XP002273381.

ETSI TS 125 211 v 5.1.0; "Universal Mobile Telecommunications System (UMTS); Physical channels and mapping of transport channels onto physical channels (FDD)", 3GPP TS 25.211, version 5.1.0 Release 5 (Jun. 2002).

ETSI TS 125 212 v5.1.0; "Universal Mobile Telecommunications System (UMTS); Multiplexing and channel coding (FDD)"", 3G TS 25.212version 5.1.0 Release 5 (Jun. 2002)".

ETSI TS 125 213 v5.1.0; "Universal Mobile Telecommunications System (UMTS); Spreading and modulation (FDD)", 3G TS 25.213, version 5.1.0 Release 5 (Jun. 2002).

ETSI TS 125 214 v5.1.0; "Universal Mobile Telecommunications System (UMTS); Physical layer procedures (FDD)", 3G TS 25.214. version 5.1.0 Release 5 (Jun. 2002).

International Preliminary Report on Patentability—PCT/US2003/025623, International Search Authority—IPEA/US—Jun. 16, 2005.

* cited by examiner

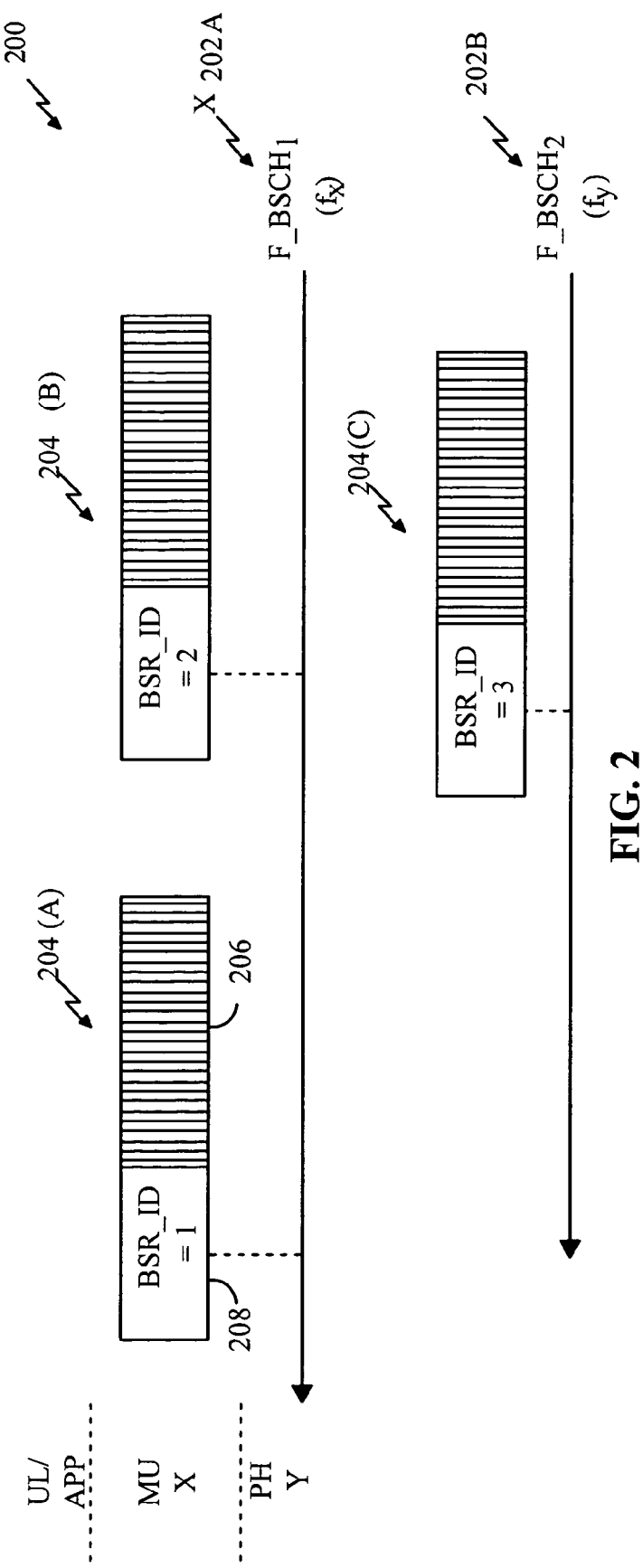
FIG. 2
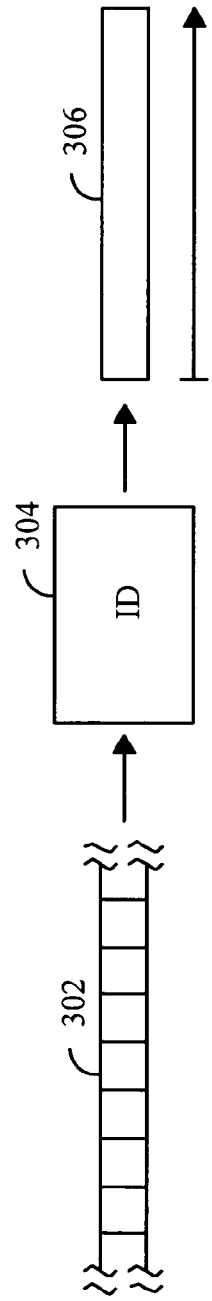
FIG. 3 --PRIOR ART--

METHOD AND SYSTEM FOR COMMUNICATING CONTENT ON A BROADCAST SERVICES COMMUNICATION SYSTEM

CLAIM OF PRIORITY UNDER 35 U.S.C. §120

The present Application for Patent is a Continuation of patent application Ser. No. 10/226,059 entitled "Method and System for Communicating Content on a Broadcast Services Communication System" filed on Aug. 21, 2002 now U.S. Pat. No. 7,016,327, and assigned to the assignee hereof and hereby expressly incorporated by reference herein.

BACKGROUND

1. Field

The present invention relates to broadcast communications, otherwise known as point-to-multipoint communications, in a wireline or a wireless communication system. More particularly, the present invention relates to a system and method for utilization of an outer decoder in such a broadcast communication system.

2. Background

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

An example of a data only communication system is a high data rate (HDR) communication system that conforms to the TIA/EIA/IS-856 industry standard, hereinafter referred to as the IS-856 standard. This HDR system is based on a communication system disclosed in co-pending application Ser. No. 08/963,386, entitled "METHOD AND APPARATUS FOR HIGH RATE PACKET DATA TRANSMISSION," filed Nov. 3, 1997, and assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

In a multiple-access communication system, communications among users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

The above described wireless communication service is an example of a point-to-point communication service. In contrast, broadcast services provide point-to-multipoint communication service. The basic model of a broadcast system consists of a broadcast net of users served by one or more central stations, which transmit information with a certain contents, e.g., news, movies, sports events and the like to the users. Each broadcast net user's subscriber station monitors a common broadcast forward link signal. Because the central station fixedly determines the content, the users are generally not communicating back. Examples of common usage of broadcast services communication systems are TV broadcast, radio broadcast, and the like. Such communication systems are generally highly specialized purpose-build communication systems. With the recent, advancements in wireless cellular telephone systems there has been an interest of utilizing the existing infrastructure of the—mainly point-to-point cellular telephone systems for broadcast services. (As used herein, the term "cellular" systems encompasses communication systems utilizing both cellular and PCS frequencies.)

The information signal to be exchanged among the terminals in a communication system is often organized into a plurality of packets. For the purposes of this description, a packet is a group of bytes, including data (payload) and control elements, arranged into a specific format. The control elements comprise, e.g., a preamble and a quality metric. The quality metric comprises, e.g., cyclical redundancy check (CRC), parity bit(s), and other types of metric known to one skilled in the art. The packets are usually formatted into a message in accordance with a communication channel structure. The message, appropriately modulated, traveling between the origination terminal and the destination terminal, is affected by characteristics of the communication channel, e.g., signal-to-noise ratio, fading, time variance, and other such characteristics. Such characteristics affect the modulated signal differently in different communication channels. Consequently, transmission of a modulated signal over a wireless communication channel requires different considerations than transmission of a modulated signal over a wire-like communication channel, e.g., a coaxial cable or an optical cable. In addition to selecting modulation appropriate for a particular communication channel, other methods for protecting the information signal have been devised. Such methods comprise, e.g., encoding, symbol repetition, interleaving, and other methods know to one of ordinary skill in the art. However, these methods increase overhead. Therefore, an engineering compromise between reliability of message delivery and the amount of overhead must be made. Even with the above-discussed protection of information, the conditions of the communication channel can degrade to the point at which the destination station possibly cannot decode (erases) some of the packets comprising the message. In data-only communications systems, the cure is to re-transmit the non-decoded packets using an Automatic Retransmission reQuest (ARQ) made by the destination station to the origination station. However, as discussed, the subscribers do not communicate back to the base station. Furthermore, even if the subscribers were allowed to communicate ARQ, this communication might overload the communication system. Consequently, other means of information protection are desirable.

Based on the foregoing, there is a need in the art for a method and a system and method for utilization of an outer decoder in such a broadcast communication system.

SUMMARY

Embodiments disclosed herein address the above stated needs by providing a method and a system executing the method to utilize an outer decoder. The use of the outer decoder further facilitates reducing power consumption of a subscriber station by determining a number of frames that must be received correctly; and terminating reception of the frames when said determined number of frames was received correctly.

In another aspect of the invention, the use of the outer decoder further facilitates improved method for hard handoff on a common broadcast channel by receiving at a subscriber station frames transmitted on the common broadcast channel from a first sector; determining at the subscriber station a need for handoff; identifying at the subscriber station at least one sector belonging to a soft handoff group different from a soft handoff group including the first sector; determining a number of frames from a current buffer that must be received correctly; terminating reception of the frames when said determined number of frames were received correctly; and beginning reception of frames from the identified at least one sector.

In another aspect of the invention, the use of the outer decoder further facilitates improved method for inter-frequency hard handoff by receiving at a subscriber station service on a channel from a sector in the origination system; determining at the subscriber station a need for handoff; identifying at the subscriber station a destination system; determining a number of frames from a current buffer that must be received correctly; terminating reception of the frames when said determined number of frames were received correctly; tuning to a frequency of the destination system; and receiving service on a channel from at least one sector if the at least one sector of the destination system is acquired at the subscriber station.

In another aspect of the invention, the use of the outer decoder further facilitates utilizing a common broadcast channel for signaling by replacing part of a content of a parity portion of a transmitting buffer with a signaling information; and transmitting a content of the transmitting buffer at a determined time on the common broadcast channel.

BRIEF DESCRIPTION OF THE DRAWINGS

FIG. 2 illustrates a concept of physical and logical channels for the HSBS;

FIG. 3 illustrates a prior art encoding;

DETAILED DESCRIPTION

Definitions

Figure 1:
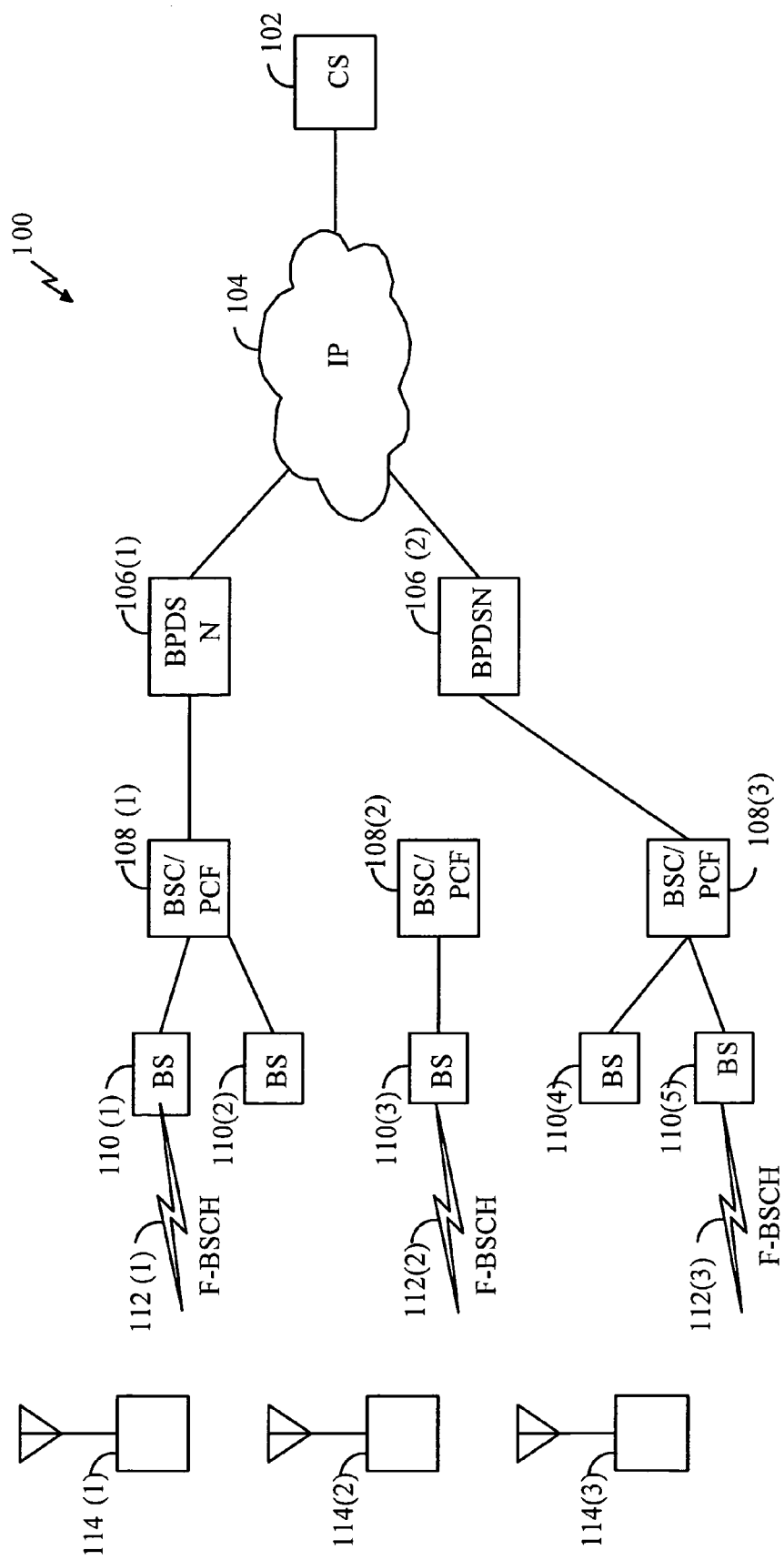
FIG. 1 illustrates conceptual block diagram of a High-Speed Broadcast Service communication system.

The word "exemplary" is used herein to mean "serving as an example, instance, or illustration." Any embodiment described herein as "exemplary" is not necessarily to be construed as preferred or advantageous over other embodiments.

The terms point-to-point communication is used herein to mean a communication between two subscriber stations over a dedicated communication channel.

The terms broadcast communication or point-to-multi-point communication are used herein to mean a communication wherein a plurality of subscriber stations are receiving communication from one source.

The term packet is used herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used herein to mean a collection of base stations (BS) and one or more base stations' controllers. The access network transports data packets between multiple subscriber stations. The access network may be further connected to additional networks outside the access network, such as a corporate intranet or the Internet, and may transport data packets between each access terminal and such outside networks.

The term base station is used herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station is used herein to mean the hardware with which an access network communicates. A subscriber station may be mobile or stationary. A subscriber station may be any data device that communicates through a wireless channel or through a wired channel, for example using fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term physical channel is used herein to mean a communication route over which a signal propagates described in terms of modulation characteristics and coding.

The term logical channel is used herein to mean a communication route within the protocol layers of either the base station or the subscriber station.

The term communication channel/link is used herein to mean a physical channel or a logical channel in accordance with the context.

The term reverse channel/link is used herein to mean a communication channel/link through which the subscriber station sends signals to the base station.

A forward channel/link is used herein to mean a communication channel/link through which a base station sends signals to a subscriber station.

The term soft handoff is used herein to mean a communication between a subscriber station and two or more sectors, wherein each sector belongs to a different cell. The reverse link communication is received by both sectors, and the forward link communication is simultaneously carried on the two or more sectors' forward links.

The term softer handoff is used herein to mean a communication between a subscriber station and two or more sectors, wherein each sector belongs to the same cell. The reverse link communication is received by both sectors, and the forward link communication is simultaneously carried on one of the two or more sectors' forward links.

The term erasure is used herein to mean failure to recognize a message.

The term dedicated channel is used herein to mean a channel modulated by information specific to an individual subscriber station.

The term common channel is used herein to mean a channel modulated by information shared among all subscriber stations.

Description

As discussed, a basic model of a broadcast system comprises a broadcast net of users, served by one or more central stations, which transmit information with a certain contents, e.g., news, movies, sports events and the like to the users. Each broadcast net user's subscriber station monitors a common broadcast forward link signal. FIG. 1 illustrates a conceptual block diagram of a communication system 100, capable of performing High-Speed Broadcast Service (HSBS) in accordance with embodiments of the present invention.

The broadcast content originates at a content server (CS) 102. The content server may be located within the carrier network (not shown) or outside Internet (IP) 104. The content is delivered in a form of packets to a broadcast packet data-serving node (BPDSN) 106. The term BPSDN is used because although the BPDSN may be physically co-located, or be identical to the regular PDSN (not shown), the BPSDN may be logically different from a regular PDSN. The BPDSN 106 delivers the packets according to the packet's destination to a packet control function (PCF) 108. The PCF is a control entity controlling function of base stations 110 for the HSBS as a base station controller is for regular voice and data services. To illustrate the connection of the high level concept of the HSBS with the physical access network, FIG. 1 shows a PCF physically co-located or even identical, but logically different from a base station controller (BSC). One of ordinary skill in the art understands that this is for pedagogical purposes only. The BSC/PCF 108 provides the packets to base stations 114.

The communication system 100 enables High-Speed Broadcast Service (HSBS) by introducing a forward broadcast shared channel (F-BSCH) 112 capable of high data rates that can be received by a large number of subscriber stations 114. The term forward broadcast shared channel is used herein to mean a single forward link physical channel that carries broadcast traffic. A single F-BSCH can carry one or more HSBS channels multiplexed in a TDM fashion within the single F-BSCH. The term HSBS channel is used herein to mean a single logical HSBS broadcast session defined by the session's broadcast content. Each session is defined by a broadcast content that may change with time; for example, 7am—News, 8am—Weather, 9am—Movies, etc. FIG. 2 illustrates the discussed concept of physical and logical channels for the HSBS.

As illustrated in FIG. 2, an HSBS is provided on two F-BSCHs 202, each of which is transmitted on a separate frequency fx, fy. Thus, for example, in the above-mentioned cdma2000 communication system such a physical channel can comprise, e.g., a forward supplemental channel (F-SCH), forward broadcast control channel (F-BCCH), forward common control channel (F-CCCH), other common and dedicated channels and the channel's combination. The use of common and dedicated channels for information broadcast is disclosed in a provisional U.S. Patent Application Ser. No. 60/279,970, entitled "METHOD AND APPARATUS FOR GROUP CALLS USING DEDICATED AND COMMON CHANNELS IN WIRELESS NETWORKS", filed Mar. 28, 2001, and assigned to the assignee of the present invention. One of ordinary skill in the art understands that other communication systems utilize channels performing similar function, therefore, the teaching is applicable to other communication systems. The F-BSCHs 202 carry the broadcast traffic, which may comprise one or more broadcast sessions. The F-BSCHs 202b carries one HSBS channel 204c; two HSBS channels 204a, 204b are multiplexed onto the F-BCCH 202a. The content of an HSBS channel is formatted into packets comprising a payload 206 and a header 208.

One of ordinary skill in the art recognizes that the HSBS broadcast service deployment as illustrated in FIG. 2 is for pedagogical purposes only. Therefore, in a given sector, the HSBS broadcast service can be deployed in several manners in accordance with features supported by an implementation of a particular communication system. The implementation features include, e.g., the number of HSBS sessions supported, number of frequency assignments, number of broadcast physical channels supported, and other implementation features known to one skilled in the art. Thus, for example, more than two frequencies, and F-BSCHs may be deployed in a sector. Furthermore, more than two HSBS channels may be multiplexed onto one F-BSCH. Furthermore, a single HSBS channel can be multiplexed onto more than one broadcast channel within a sector, on different frequencies to serve the subscribers residing in those frequencies.

As discussed, communications systems often transmit information in frames or blocks, which are protected by encoding against adverse condition affecting a communication channel. Examples of such systems comprise cdma2000, WCDMA, UMTS. As illustrated in FIG. 3, the bit stream of information to be transmitted 302, originating at higher layers, is provided to an (inner) encoder 304 on a physical layer. The encoder accepts a block of bits of a length S. This block of S bits typically includes some overhead, e.g., tail bits for the inner encoder, a cyclic redundancy check (CRC) to assist the inner decoder at the receiving side ascertain success or failure of decoding help the inner decoder, and other overhead information known to one of ordinary skills in the art. The encoder then encodes the S bits with a selected code resulting in an encoded block of length P=S+R, where R denotes the number of redundant bits. One of ordinary skills in the art understands that although the embodiments are explained in terms of layering model, this is for pedagogical purposes, and the various illustrative logical blocks, modules, circuits, and algorithm steps described in connection with the physical layer are implemented as electronic hardware, computer software, or combinations of both. Thus, for example, the inner encoder 304 may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Figure 4:
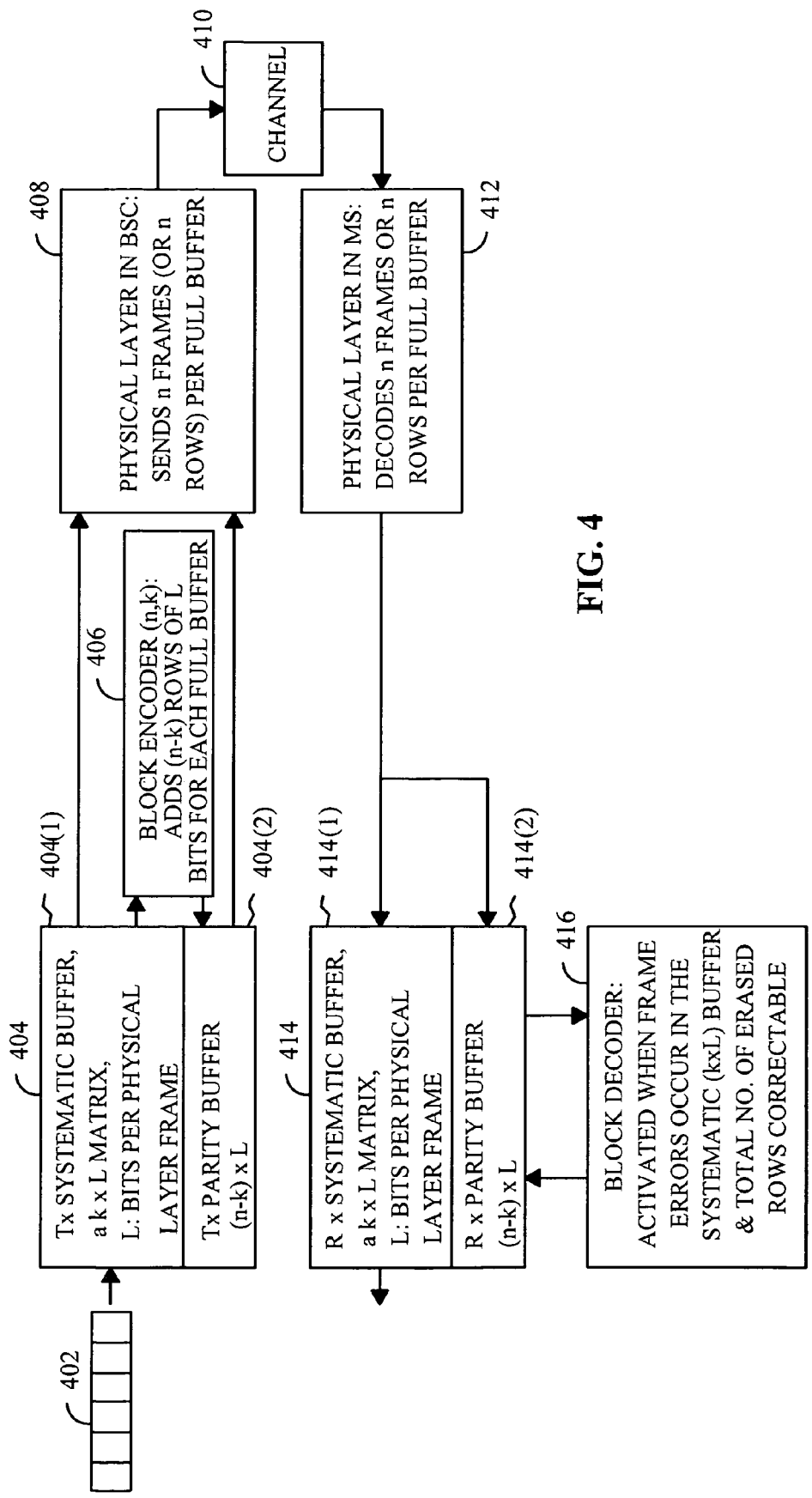
FIG. 4 illustrates physical layer processing in accordance with one embodiment of the invention.
Figure 5:
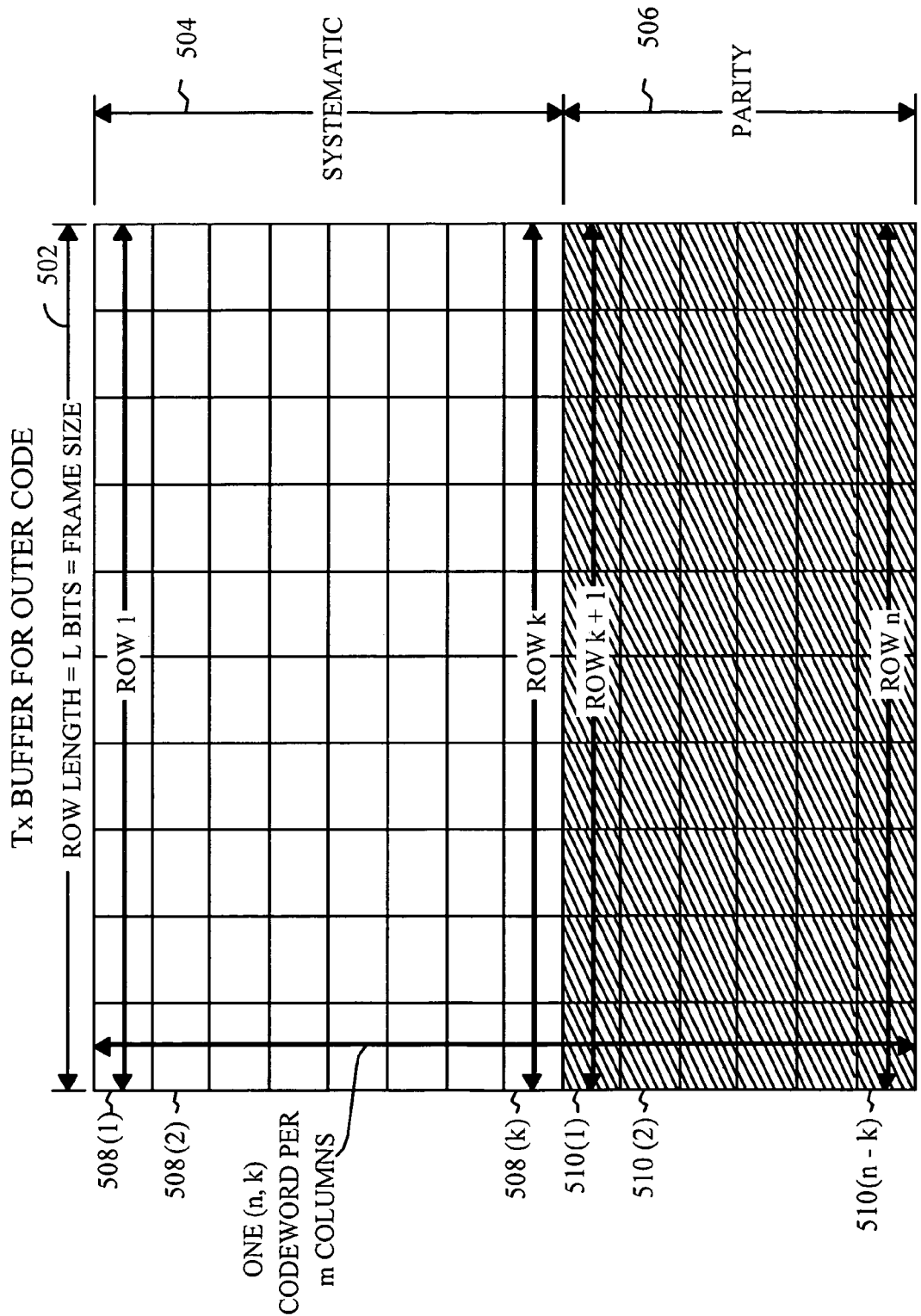
FIG. 5 illustrates a transmit buffer.

In accordance with one embodiment of the present invention, as illustrated in FIG. 4, the bit stream of information to be transmitted 402 is first encoded by an outer endecoder 406 and the encoded stream is then provided into the inner encoder (not shown), residing on the physical layer 408. The bit stream of information to be transmitted 402, originating at higher layers, is provided to a transmit buffer 404. The transmit buffer is illustrated in more detail in FIG. 5. Referring to FIG. 5, the bits fill the systematic portion 504 of the transmit buffer 404 (of FIG. 4) row by row from left to right. The systematic portion 504 comprises k rows 508 of length L. In one embodiment, as shown in FIG. 5, the length L of the buffer coincides with the length of a radio frame without the overhead (e.g., CRC to help the inner decoder and the tail bits for the inner encoder). Referring back to FIG. 4, once the systematic portion 504 (of FIG. 5) is full, the outer block encoder 406 is activated to perform column-wise encoding of the bits in the systematic portion 504 (of FIG. 5) to generate (n−k) additional rows 510 (of FIG. 5) of parity bits. This column-wise operation is performed column by column for binary outer code, i.e., m=1. For non-binary code, i.e., m>1, every m adjacent columns in a row are treated as an m-bit symbol. The m-bit symbols along the top k rows are read by the outer encoder to produce n−k m-bit symbols that fill the corresponding lower n−k rows of these columns.

In another embodiment, the length L of the buffer is equal to the number of bits the inner coded frames carries divided by m, the dimension of the outer encoder code. In this embodiment, the first m rows from the TX buffer are sent in the first inner coded frame, the second m rows of bits are sent in the second inner-coded frame, until the entire buffer is transmitted. Referring back to FIG. 4, once the systematic portion 504 (of FIG. 5) is full, the outer block encoder 406 is activated to perform column-wise encoding of the bits in the systematic portion 504 (of FIG. 5) to generate m(n−k) additional rows 510 (of FIG. 5) of parity bits. This column-wise operation is performed column by column for binary outer code, i.e., m=1. For non-binary code, i.e., m>1, every m-rows of a column form an m-bit symbol. The k symbols from the top k m rows in the column are read by the outer encoder to produce (n−k) m-bit symbols that fill the corresponding lower m(n−k) rows of this column.

In one embodiment the outer encoder comprises a systematic Reed-Solomon (R-S). The content of the transmit buffer 404 is then provided to a physical layer 408. On the physical layer 408, the individual frames are encoded by an inner encoder (not shown), which results in encoded frames. The structure of the inner decoder may be, e.g., the structure of FIG. 3. The systematic rows and the parity rows of the buffer may be interlaced during transmission to reduce the chance of large number of systematic rows erased when the total number of inner code erasure exceeds the outer code's correcting capability. The frames are further processed in accordance with a selected modulation scheme. In one embodiment, the processing is performed in accordance with the IS-2000 standard. The processed frames are then transmitted over a communication channel 410.

The transmitted frames are received at the destination station and provided to a physical layer 412. On the physical layer 412, the individual frames are demodulated and provided to an inner decoder (not shown). In one embodiment, the inner decoder decodes each frame, and if the decoding is successful, outputs a correctly decoded frame; or if the decoding is unsuccessful, declares an erasure. The success or failure of decoding must be determined with a high accuracy. In one embodiment, this is achieved by including a long (for example, 16-bit) cyclic redundancy check (CRC) in the frame after outer encoding and before inner encoding. However, one of ordinary skills in the art recognizes that other mechanisms for frame quality indication may be used. The included CRC obtained from the decoded frame is compared with a CRC calculated from the bits of the decoded frame, and if the two CRCs are identical, the decoding is declared successful. Further processing at the physical layer proceeds in accordance with the result of the inner decoder decision.

The correctly decoded frames are provided to the appropriate rows of a of a receive buffer 414. If all the systematic k frames are correctly decoded by the inner decoder, the systematic frames from the systematic portion 414(1) of the receive buffer 414 are passed to upper layer (not shown) for further processing without outer decoding.

If the inner decoder cannot decode the frame, the decoder declares an erasure, and provides an outer block decoder 416 with an indication that the frame is missing. The process continues until there are as many parity frames received correctly and passed to a parity portion 414(2) of a receive buffer 414, as there are erased systematic frames. The receiver stops the reception of any remaining frames and the outer decoder (not shown) is activated to recover the erased systematic frames. The recovered systematic frames are passed to the upper layer.

If the total number of correctly received frames in the receive buffer 414 is less than k, in accordance with one embodiment the outer decoder is not activated since there is no guarantee that the decoding would be successful. The correctly received systematic frames together with identification of the missing bits are passed to the higher layers. In another embodiment, the receiver uses decoded bits from the inner decoder (which are unreliable as indicated by the failed CRC checks) to recover bits for the systematic bits. In accordance with one embodiment, the receiver decodes the unreliable bits from the inner decoder and finds the most likely codeword. In the another embodiment, the receiver uses measurement of the signal quality of the erased frames in the buffer to choose enough erroneously received frames with the highest signal to noise ratio to form a sub buffer with k rows. The receiver then performs bit flipping (changing a bit value of 0 to a bit value 1 and vice versa at one column at a time) and checks whether the bit flipping resulted in a codeword. In one embodiment, the bit flipping is first performed on the least reliable bits and continues with bits in the order of the bits' increasing reliability. The reliability of a bit may be determined in accordance with inner decoding metrics, e.g., a signal to noise and interference ratio during the frame, like the Yamamoto metric, the re-encoded symbol error rate, re-encoded energy metric, and other metrics known to one of ordinary skills in the art, or the metrics' combinations. If a codeword was not found, the bit flipping continues through all the remaining columns for all the unreliable rows. If a codeword was not found, the bit flipping continues with increased number of bits flipped (that is, changing 2 bits at a time, then 3 bits, until the maximum number of bits), until either a codeword is found or all combinations are exhausted. In another embodiment, the CRC from the unreliable rows are used to check the overall success of the decoding in this situation. The frames are passed to the higher layers only if the CRC from all rows match; otherwise, only bits from reliable rows are passed to the higher layers.

To improve reliability of decoding, in another embodiment, the demodulation and inner decoding are performed for more than k correctly received frames in a buffer. In accordance in yet another embodiment the demodulation and inner decoding are performed for all frames in the buffer. In both embodiments, the outer decoding is performed on the k (or km) rows with the highest quality. The quality may be determined in accordance with inner decoding metrics, e.g., a signal to noise and interference ratio during the frame, like the Yamamoto metric, the re-encoded symbol error rate, re-encoded energy metric, and other metrics known to one of ordinary skills in the art, or the metrics' combinations. Use of quality metrics for quality estimation is disclosed in detail in U.S. Pat. No. 5,751,725 entitled "METHOD AND APPARATUS FOR DETERMINING THE RATE OF RECEIVED DATA IN A VARIABLE RATE COMMUNICATIONS SYSTEM" and U.S. Pat. No. 5,774,496 entitled "METHOD AND APPARATUS FOR DETERMINING DATA RATE OF TRANSMITTED VARIABLE RATE DATA IN A COMMUNICATIONS RECEIVER" and both are assigned to the assignee of the present invention.

Battery Power Savings

An important requirement for a subscriber station is low battery power consumption. The above-described encoding method ensures that less than n correctly received frames are sufficient for decoding the systematic information per one transmitting buffer. Consequently, it is not necessary for the subscriber station to receive all n frames to decode the transmitted information. If the subscriber station determines the amount of redundancy, for example from an encoding rate of the frames, the subscriber station may determine a number of frames that must be received correctly, i.e., be declared correctly decoded by the inner decoder for the outer decoder to decode correctly. The subscriber station may determine the encoding rate by several methods known to one of ordinary skills in the art. Thus, for example, there can be only one fixed encoding rate. If more than one rate is used, the subscriber station can use a blind rate determination, or the possible data rates are provided to the subscriber station by the origination station. Furthermore, the information about the amount of redundancy may be provided to the subscriber station.

Once the subscriber station accumulates the determined number of frames correctly decoded by the inner decoder into the receive buffer 414 (both the systematic portion 414(1) and the parity portion 414(2)), the subscriber station may terminate reception and inner decoding of additional frames. Therefore, a battery power savings is accomplished. Because the subscriber station knows a number of frames in the transmit buffer 404 and the number of frames it received, the subscriber station may determine a time when the subscriber station needs to start reception and inner decoding of the frames comprising new systematic information.

Because the HSBS is provided in addition to traditional communication system services, e.g., voice, short message system, data, and other services known to one of ordinary skills in the art, the subscriber station is required to be able to receive such traditional services while engaged in an HSBS. Thus, the subscriber station needs to be able to receive signaling messages. The signaling in broadcast services is disclosed in detail in a co-pending application Ser. No. 09/933, 978, entitled "METHOD AND SYSTEM FOR SIGNALING IN BROADCAST COMMUNICATION SYSTEM," filed Aug. 20, 2001, and assigned to the assignee of the present invention. The signaling activities include, e.g., paging message reception, answer to paging message, overhead messages containing the system configuration reception, search for the neighboring systems on the same or different frequencies, and other signaling known to one of ordinary skills in the art. As discussed above, the subscriber station may discontinue reception activities after accumulating enough frames in the buffer, thus may miss signaling information.

Consequently, in one embodiment, the signaling activities the subscriber station receiving the broadcast channel has to perform are carried out during the most likely time the subscriber station is receiving the broadcast channel. The most likely time the subscriber station receiving the broadcast channel is usually when the portion of the buffer where systematic rows are transmitted over the air. Alternatively, a subscriber station is obligated to receive the broadcast channel at a pre-defined time. Therefore, the subscriber station must ascertain that the subscriber station does not terminate reception of the frames before the time, during which the subscriber station is obligated to receive the broadcast channel.

Hard Handoff on a Common Broadcast Forward Link

To enhance the Common Broadcast Forward Link performance, soft and softer handoffs are desirable in overlapped coverage areas of different sectors. The method and system for providing a communication with a subscriber station through more than one base station during the soft handoff process are disclosed in a co-pending application Ser. No. 09/933,607, entitled "METHOD AND SYSTEM FOR A HANDOFF IN A BROADCAST COMMUNICATION SYSTEM," filed on Aug. 20, 2001, and assigned to the assignee of the present invention.

Figure 6:
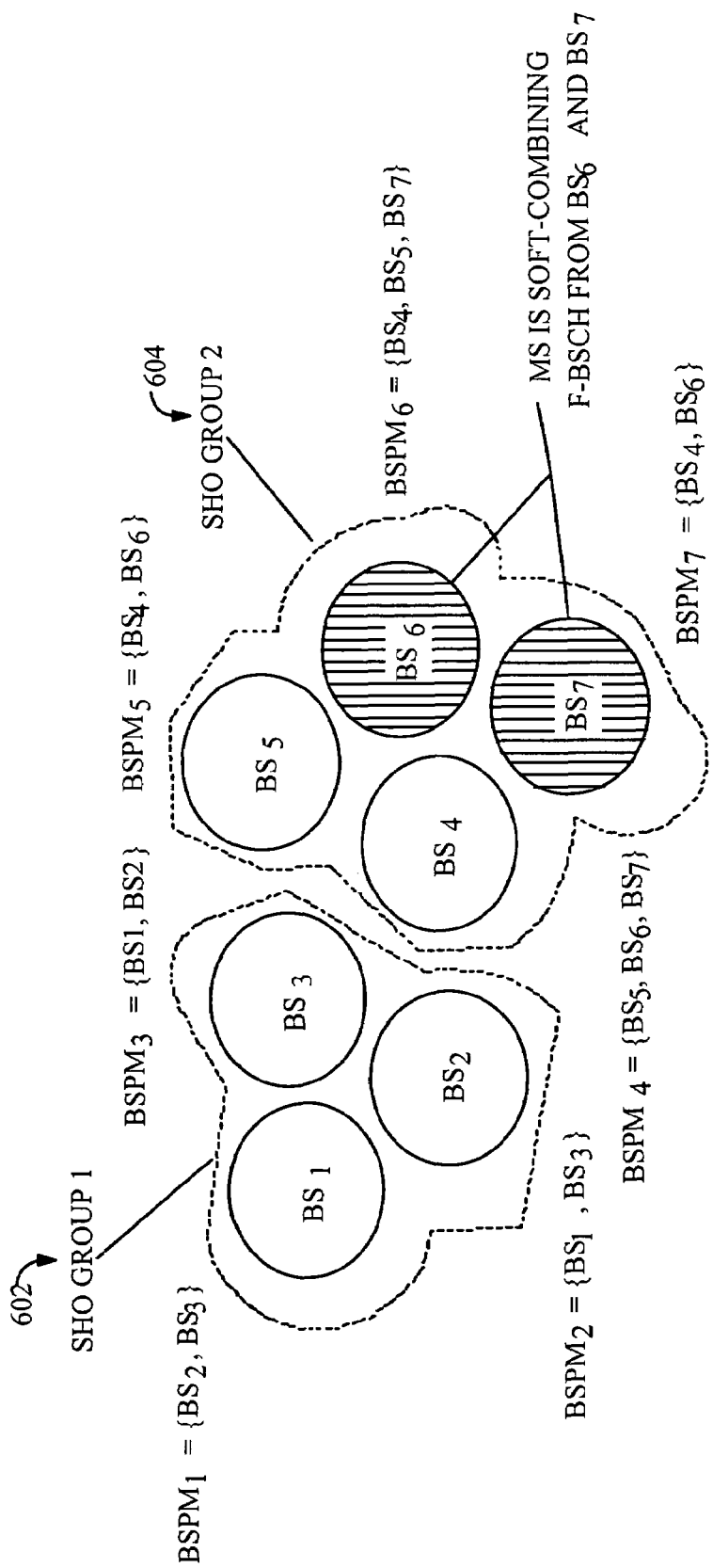
FIG. 6 illustrates concept of soft-handoff groups in a broadcast communication system.

Although the described soft and softer handoff method is desirable because the subscriber station does not experience a discontinuity in transmitted information, such methods cannot be always utilized in a broadcast communication system. A subscriber station may soft combine only synchronous transmissions; consequently, the subscriber station may perform a soft and softer handoff only between base stations that belong to the same soft handoff (SHO) group. As used herein a SHO group means a group of all Base Stations transmitting the Common Broadcast Forward Link simultaneously and synchronously. FIG. 6 illustrates two SHOs, one comprising $BS_1$, $BS_2$, and $BS_3$, the other comprises $BS_4$, $BS_5$, $BS_6$, and $BS_7$. Consequently, if the subscriber station crosses boundaries from a coverage area of SHO Group 1 602 to a coverage area of SHO Group 2 604, a hard handoff is required.

The use of the above-described encoding method increases the probability that the subscriber station either does not experience a discontinuity in transmitted information or minimize such discontinuity if the discontinuity occurs.

Figure 7:
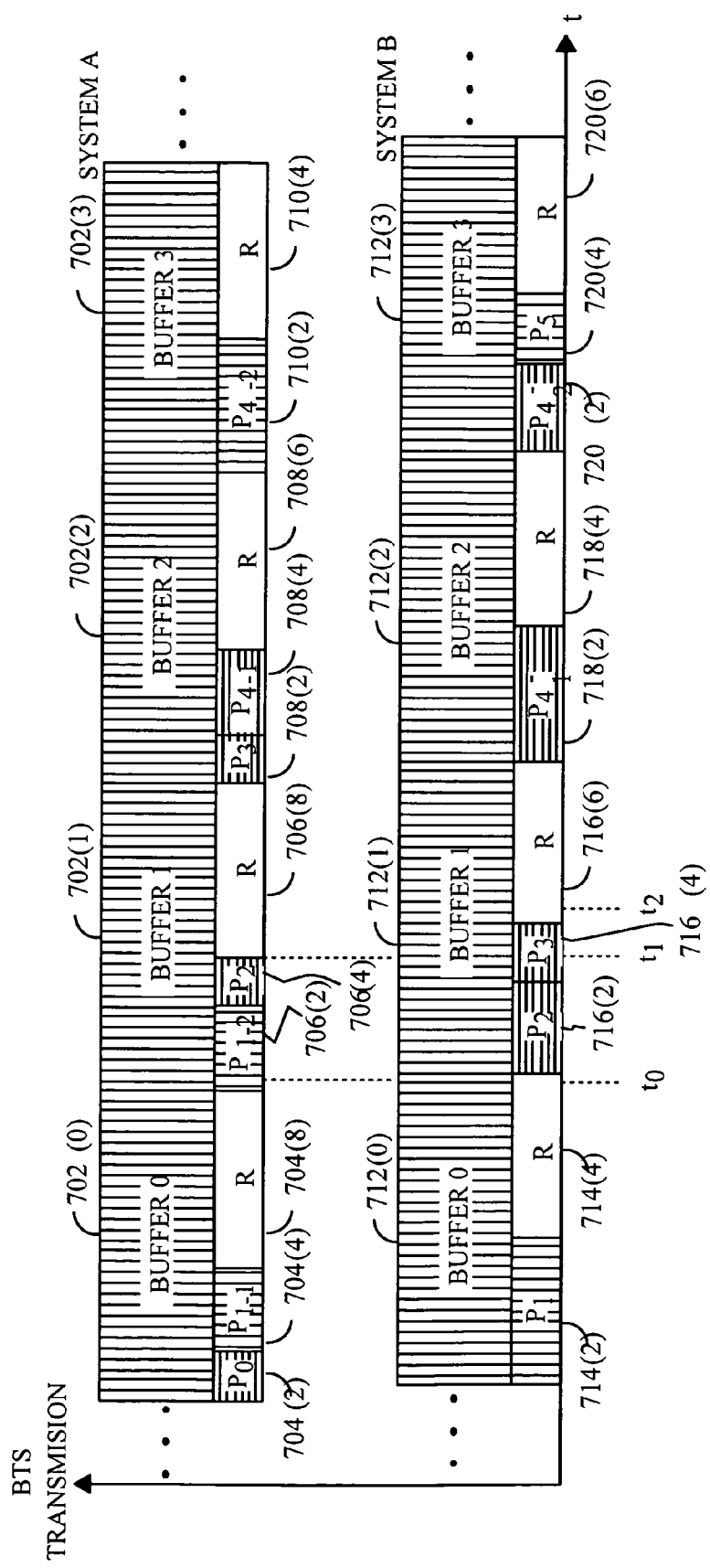
FIG. 7 illustrates timing diagram for hard handoff.

FIG. 7 illustrates unsynchronized transmission between SHO Group 1 602 and SHO Group 2 604 (from FIG. 6), where the transmission from the Base Stations of SHO Group 2 604 is delayed relative to the transmission from the Base Stations of SHO Group 1 602. The subscriber station (not shown) is monitoring transmission from a base station of SHO Group 1 602. At time $t_0$ the subscriber station determines that a hard handoff to a different SHO Group is indicated. The handoff is indicated, e.g., when a quality metric of received transmission falls below a threshold. The subscriber station then determines whether a soft handoff is possible. In accordance with one embodiment, the subscriber station determines a configuration of neighbor sectors in accordance with a value of an HSBS neighbor configuration indicator (NGHBR_CONFIG_HSBS) transmitted by the current base station. Such a method is described in detail in the above-cited co-pending application Ser. No. 09/933,607 entitled "METHOD AND SYSTEM FOR A HANDOFF IN A BROADCAST COMMUNICATION SYSTEM," filed Aug. 20, 2001, and assigned to the assignee of the present invention. The subscriber station continues to accumulate frames of Buffer 1 702(1) until time $t_1$, when the subscriber station has accumulated enough good frames in Buffer 1 702(1) for decoding. This includes packets $P_0$ 704(2), $P_1$ (which was transmitted in part $P_{1-1}$ 704(4) in Buffer 0 702(0) and part $P_{1-2}$ 706(2) in Buffer 1 702(1)), and $P_2$ 706(4). The symbol P denotes a systematic part of a buffer; the symbol R denotes the redundant part. The subscriber station initiates hard handoff and acquires transmission a base station of SHO Group 2 604 in time $t_2$. The interval $\Delta t = t_2 - t_1$ depends on the type of handoff the subscriber station performs, e.g., inter-frequency hard handoff, same frequency handoff, design of the subscriber station and base station, and other criteria known to one of ordinary skills in the art. Different methods of performing handoff are discussed in the above-cited co-pending application Ser. No. 09/933,607, entitled "METHOD AND SYSTEM FOR A HANDOFF IN A BROADCAST COMMUNICATION SYSTEM," filed Aug. 20, 2001 and assigned to the assignee of the present invention. Thus at time $t_2$ the subscriber station begins receiving frames 712 transmitted by a base station of SHO Group 2 604. Because of the correcting capability of the encoding in accordance with an embodiment of this invention, the received frames may be enough to correctly decode packets $P_2$ 716(2), $P_3$ 716(4) of Buffer 1 716(4). The subscriber station discards any duplicate packets. One of ordinary skills in the art recognizes that the above-disclosed principles apply in the scenario, in which the transmission from the base stations of SHO Group 1 602 is advanced relative to the transmission from the base stations of SHO Group 2 604.

Inter-frequency Hard Handoff

If a subscriber station travels outside the boundary of the communication system, with which it is currently communicating, it is desirable to maintain the communication link by transferring the call to a neighboring system, if one exists. The neighboring system may use any wireless technology, examples of which are CDMA, NAMPS, AMPS, TDMA or FDMA. If the neighboring system uses CDMA on the same frequency band as the current system, an inter-system soft handoff can be performed. In situations where inter-system soft handoff is not available, the communication link is transferred through a hard handoff where the current connection is broken before a new one is made. Examples of typical hard handoff situations include: (1) the situation in which a subscriber station is traveling from region serviced by a CDMA system to a region serviced by a system employing an alternate technology and (2) the situation in which a call is transferred between two CDMA systems which use different frequency bands (inter-frequency hard handoff).

Inter-frequency hard handoffs can also occur between base stations of the same CDMA system. For example, a region of high demand such as a downtown area may require a greater number of frequencies to service demand than the suburban region surrounding it. It may not be cost effective to deploy all available frequencies throughout the system. A call originating on a frequency deployed only in the high congestion area must be handed off as the user travels to a less congested area. Another example is that of a microwave or other service operating on a frequency within the system's boundaries. As users travel into an area suffering from interference from the other service, their call may need to be handed off to a different frequency.

A method for performing hard handoff attempt with greater probability of success is disclosed in the U.S. Pat. No. 5,999,816, entitled "METHOD AND APPARATUS FOR PERFORMING MOBILE ASSISTED HARD HANDOFF BETWEEN COMMUNICATION SYSTEMS", assigned to the assignee of the present invention. In the U.S. Pat. No. 5,999,816 patent, subscriber stations tune temporarily to the frequency of the hard handoff destination system and search for available pilot signals on that frequency, for inclusion of the associated base stations in the active set. If the search is successful, and at least one of the associated base stations satisfies the criteria to be included in the active set, the subscriber station acquires the base station. In the event that the hard handoff attempt is unsuccessful, the subscriber station return to the original system with information, which the original system uses to assist in the performance of future handoff attempts. Alternatively, with no handoff attempt made, the subscriber station searches the destination system. After the searching task is completed, the subscriber station will retune to the original frequency to resume current communications. While tuned to an alternate frequency, any frames of data generated by the subscriber station or transmitted by the base station will be corrupted. Typically, the base station will provide only a subset of the possible offsets for the subscriber station to search. Even so, the duration of the handoff attempt or search can be so long as to potentially corrupt a number of frames of data.

Consequently, an improved method for performing hard handoff attempt with greater probability of success is disclosed in the U.S. Pat. No. 6,134,440 entitled "METHOD AND APPARATUS FOR PERFORMING MOBILE STATION ASSISTED HARD HANDOFF USING OFF LINE SEARCHING", and assigned to the assignee of the present invention. In the U.S. Pat. No. 6,134,440, after having been directed to search for pilot signals in an alternate frequency band, the subscriber station tunes to that alternate frequency and samples the incoming data, storing those samples in memory. During the time that the subscriber station is tuned to the alternate frequency, all data being transmitted to the subscriber station on the forward link is lost. Similarly, any reverse link data transmitted by the subscriber station would be transmitted on the alternate frequency. Therefore, such reverse link data would not be received at the origination base station. When a sufficient number of samples have been stored, the subscriber station retunes to the origination frequency. At this time, the forward link data is again received by the subscriber station, and reverse link data can be successfully transmitted to the origination base station. After retuning to the origination frequency, a searcher in the subscriber station will subsequently be employed to search for pilot signal offsets utilizing the stored data collected from the alternate frequency. In accordance with the present invention, due to the relatively short period of time required to sample and store information on the alternative frequency, the active communication link is not broken. Neither is the active communication link affected by the subsequent off-line search. Because less time is required to sample the data on the alternate frequency than is required to actively search for pilot signals in real time, and because the communication link is corrupted by the hard handoff process only while the subscriber station is tuned to the alternate frequency, the interruption the forward and reverse links on the originating system are minimized. In fact, the error correction coding employed in modern communication systems may eliminate all errors introduced by sampling the alternate frequency, if the sampling time is small enough.

Using the above-described encoding method improves the searching method disclosed in both above-described co-applications. Because the subscriber station does not need to accumulate all n frames from the transmitter buffer 404, for recovering all the systematic information, once the subscriber station accumulates the determined number of frames correctly decoded by the inner decoder into the receive buffer 414 of FIG. 4 (both the systematic portion 414(1) and the parity portion 414(2)), the subscriber station may terminate reception of additional frames. Because the subscriber station knows a number of frames in the transmit buffer 404 and the number of frames it received, the subscriber station may determine time when it needs to start reception and inner decoding of frames comprising new systematic information. The subscriber station then may use the time between terminating the reception of additional frames and the time of restarting reception and inner decoding of frames to perform handoff/search in accordance to the concepts disclosed in the U.S. Pat. Nos. 5,999,816 and 6,134,440.

Consequently, once the subscriber station accumulates the determined number of frames correctly decoded by the inner decoder and the time when the subscriber station needs to start reception and inner decoding, the subscriber station terminates reception of additional frames. The subscriber station then tunes to a frequency of the destination system. The information pertaining to the destination system may be obtained, e.g., from the origination system. If the subscriber station tuned to the destination system to perform a handoff, the subscriber station attempts to acquire at least one sector of the destination system. If at least one sector of the destination system is acquired as measured e.g., by a minimum pilot signal strength of the at least one sector of the destination system, the handoff is deemed to be successful and the subscriber station remains on the destination system and begins to receive a service on a channel from the acquired sector. Otherwise, the subscriber station begins receiving signals at the frequency of the destination system and storing the signals. The subscriber station performs the storing for a time required or until the time the subscriber station needs to re-tune back to the sector in the origination system. The subscriber station then concurrently receives frames and analyzes the stored signals to identify sector(s) in a destination system to handoff. The subscriber station then may repeat the described method or to handoff to sector(s) identified by the analysis.

One of ordinary skills in the art recognizes, that the embodiments of the present invention are equally applicable to a hard handoff on a common broadcast channel and handoff on a traffic channel, as long as the encoding-decoding of the present invention is utilized by the particular channel.

Paging

As illustrated in FIG. 6, all subscriber stations in an SHO Group are either monitoring the common broadcast forward link, engaged in a communication with other subscriber stations, or monitoring a paging channel. The paging channel, which the subscriber station is monitoring, is known to the communication system. The paging channel is assigned to the subscribers monitoring the paging channel and engaged in a communication with other subscriber stations in accordance with methods utilized by current communications systems, e.g., IS-2000, WCDMA, UMTS. Additionally/alternatively, the paging channel to the subscribers is assigned in accordance with methods disclosed in co-pending application Ser. No. 09/933,607, entitled "METHOD AND SYSTEM FOR SIGNALING IN BROADCAST COMMUNICATION SYSTEM," filed Aug. 20, 2001, and assigned to the assignee of the present invention. Consequently, it is possible to page any subscriber.

In accordance with one, the common broadcast channel is utilized for paging the subscriber station monitoring the common broadcast forward link. As explained in reference to FIG. 4, HSBS channels, organized into packets, are multiplexed on the F-BSCH. Therefore, a subscriber station receiving an HSBS channel must be able to discern packets carrying signaling messages, e.g., a paging message from packets carrying the HSBS channel content. In accordance with one embodiment, a BSR_ID of certain value, e.g., '000' may be reserved to indicate that the content of a packet or packets carry signaling (paging) information. A disadvantage of this approach is that because the content of the packet or packets is synchronized in an SHO group, all subscriber stations in the SHO group receive the same paging information, whether it is meant for them or not. Because the payload per packet is finite, it may take several packets carrying paging information to page all subscribers in the SHO group. This results in delay of the HSBS channel content, which may be undesirable in certain applications.

Consequently, in accordance with another embodiment, a content of a packet or packets of an HSBS channel transmitted by the sectors in an SHO group is unsynchronized in pre-defined periodic intervals. Consequently, the content of the packet or packets can be different in each sector, therefore, allowing paging subscriber stations on a per sector basis. Because the periodic intervals are pre-defined, the subscriber stations know that the packet or packets transmitted in that interval carry signaling information.

Referring back to FIG. 5, in accordance with one embodiment, several pre-determined rows in the parity portion 506 of the transmitting buffer 502 are replaced with the paging information. When a subscriber station encounters a packet that the subscriber station knows carries paging information, the subscriber station interprets the pre-determined rows as signaling information. Because several pre-determined rows in the parity portion 506 were replaced, the information bits are unprotected, and may be erased. However, because the paging information is carried in a few packets, the base station may increase power for the time during which the packets carrying both signaling information and HSBS content are transmitted to compensate for the loss of protection due to encoding.

Alternatively, the outer encoder can encode the information rows with lesser redundancy for packet carrying both HSBS content and paging information than the redundancy for packets carrying HSBS content information. Therefore, less than (n−k) rows of the parity portion 506 of the transmitting buffer 502 are filled with the parity information. The rows unused by the parity bits may be used for the paging information. Although the protection of the packet carrying both HSBS content and paging information is less than of the packet carrying HSBS content information, the encoding rate may be designed to be satisfactory under normal channel conditions. Furthermore, the base station may increase power for the time during which the packets carrying both signaling information and HSBS content are transmitted to compensate for the loss of protection due to lesser encoding.

In accordance with another embodiment, there is no need to pre-define periodic intervals for the transmission of paging information. A packet carrying HSBS content information is encoded with one encoding rate and a packet carrying paging information is encoded with another rate. The subscriber station attempts to decode a received packet in accordance with a first rate hypothesis. If the decoding is successful, the packet is processed in accordance with the relationship between the rate hypothesis and the packet content. If the decoding is unsuccessful, the subscriber station attempts to decode the received packet in accordance with a second rate hypothesis. If the decoding is successful, the packet is processed in accordance with the relationship between the rate hypothesis and packet content. Otherwise, an erasure is declared.

Handoff While Transmitting Content of a Broadcast System

Figure 8:
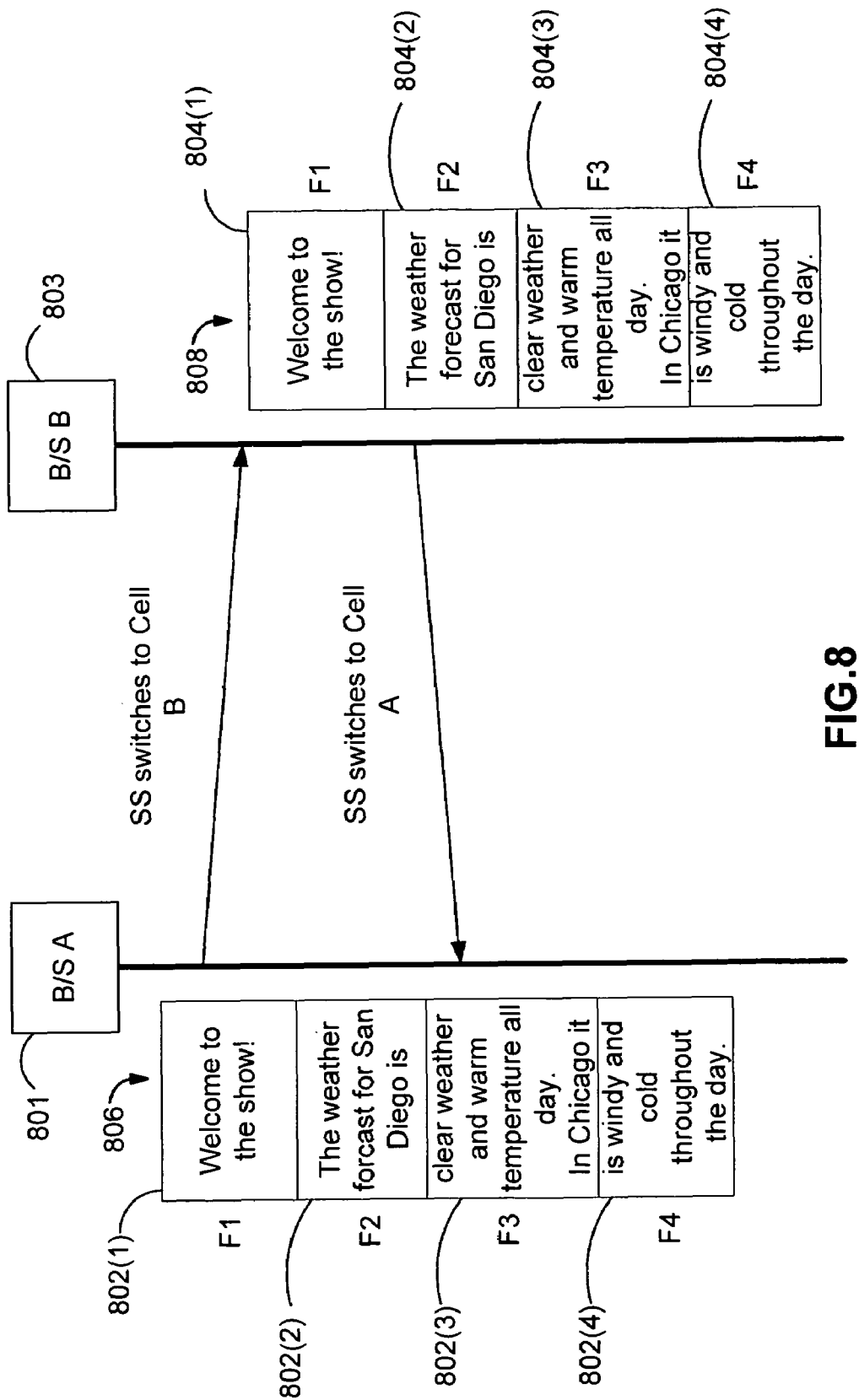
FIG. 8 illustrates a timing diagram for a handoff while a subscriber station receives broadcast content from two cells.

A handoff can occur while transmitting a buffer of content. FIG. 8 is a timing diagram illustrating a handoff of a subscriber unit from a base station A 801 to a base station B 803 while receiving a buffer of content broadcasted from base station A and base station B. In this example, the content is an introduction and the weather forecast for San Diego and Chicago. The same message content is contained in frames F1 through F4, 802(1) through 802(4) and 804(1) through 804(4), of transmit buffers 806 and 808. For ease of illustration, parity bits, or the redundant part of the transmit buffer, are not shown.

When the content transmitted by base station A and base station B is offset in time, the user of the subscriber unit can experience duplicated content and clipping of content.

For example, in the system for communicating content on a broadcast channel shown in FIG. 8, a first base station 801 comprises a first transmit buffer 806 configured to store a first plurality of inner-coded and outer-coded frames 802(1) through 802(4) containing the content. A first set of inner-coded and outer-coded frames F1 802(1) of the first plurality of inner-coded and outer-coded frames contains a first portion of the content, for example, "Welcome to the show." The first base station 801 is configured to transmit the first plurality of inner-coded and outer-coded frames on the broadcast channel.

A second base station 803 comprises a second transmit buffer 808 configured to store a second plurality of inner-coded and outer-coded frames 804(1) through 804(4) containing the same content. A second set of inner-coded and outer-coded frames 804(1) and 804(2) of the second plurality of inner-coded and outer-coded frames contains a second portion of the content, for example, "Welcome to the show" and "The weather forecast for San Diego is." The second base station 803 is configured to transmit the second plurality of inner-coded and outer-coded frames on the broadcast channel.

The frames in transmit buffers 806, 808 are inner encoded and outer encoded in the same manner. The content in transmit buffer 808, however, is transmitted with a delay with respect to the content in transmit buffer 806.

A subscriber station can perform a handoff from first base station 801 to second base station 803 while the content is being transmitted over the broadcast channel by both base stations 801 and 803. In this example, the subscriber station can receive the first set of the inner-coded and outer-coded frames F1 802(1) transmitted from the first base station A; and, after handoff, can receive the second set of the inner-coded and outer-coded frames F1 804(1) and F2 804(2) from the second base station B.

The subscriber station can also handoff back to base station A. In this example, after handoff back to base station A, the subscriber station can receive frame F4 802(4) from base station A.

Figure 9:
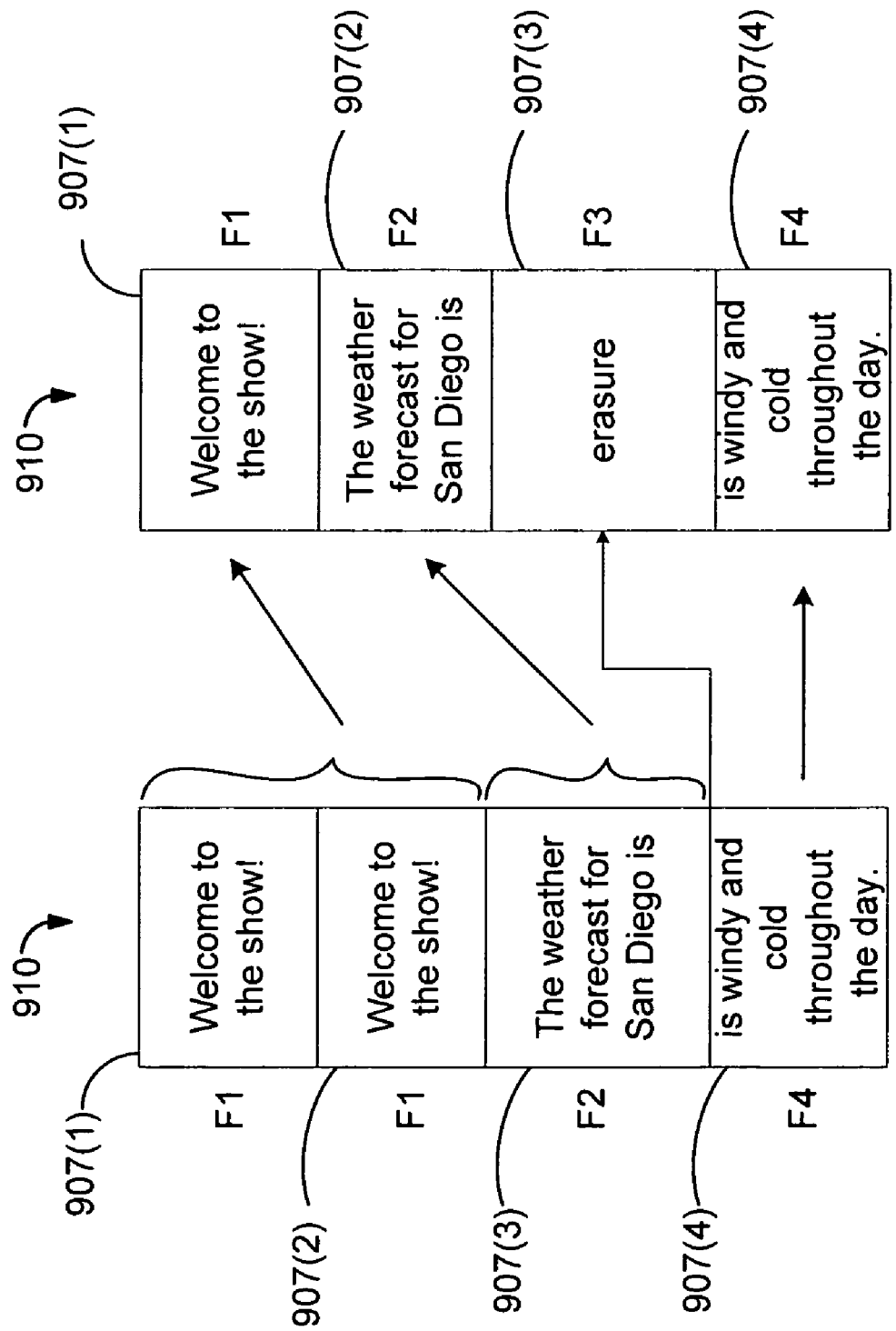
FIG. 9 illustrates a receive buffer of a subscriber station.

FIG. 9 illustrates a receive buffer of a subscriber station. The subscriber station can store the received frames in the receive buffer 910. The left side of FIG. 9 represents the content of the receive buffer in the order that frames are received by the subscriber station. The right side of FIG. 9 represents the content of the receive buffer after duplicated frames are removed from the receive buffer and clipped frames are identified as erasure frames. The non-reception of a sequential frame of content as a result of a handoff, and time-misalignment of transmissions of the same broadcast content between cells, is referred to as a "clipped" frame.

According to the contents of the left-side receive buffer, the subscriber station has received duplicate frames F1 907(1) and 907(2) as a result of the first handoff to base station B 803, and has not received clipped frame F3 as a result of the second handoff to base station A 801.

Time re-alignment of the two transmissions of the same content and outer coding can mitigate the problems of duplicate frames and clipped frames. The user of the subscriber station can experience seamless service without loss of content, even when handing over to a new cell while receiving a buffer of broadcast content.

The subscriber station can receive an indication of the time-alignment of transmission of the first plurality of inner-coded and outer-coded frames F1 802(1) through 802(4) and the second plurality of inner-coded and outer-coded frames F1 804(1) through F4 804(2). From this indication of time-alignment, the subscriber station can determine the clipped frame of the content and the duplicate frame of content.

The indication of the time-alignment can be an indication of the beginning of the transmission of a first frame F1 804(1) of the frames transmitted on the broadcast channel from the base station B 803. In a WCDMA system, the indication can be, for example, a system frame number transmitted on a broadcast control channel from the base station B. In a CDMA2000 system, the indication can be, for example, system time of the second base station B transmitted on a broadcast control channel from the second base station B.

With knowledge of the time-alignment of the transmissions, the subscriber station can determine duplicated frames such as F1 907(1) and F1 907(2) shown in the left side receive buffer 910 of FIG. 9.

The subscriber station can determine if any one of the duplicated frames F1 907(1), 907(2) have been correctly inner decoded. When any one of the duplicated frames has been correctly inner-decoded, the subscriber station can choose a one of the correctly inner decoded duplicated frames F1 907(1) or F1 907(2) for outer decoding. When none of the duplicated frames has been correctly inner-decoded, the subscriber station can identify the duplicate frames as an erasure frame. The erasure frame can be corrected using outer decoding.

The right-side receive buffer shown in FIG. 9 illustrates the situation where at least one of the frames F1 907(1), 907(2) has been correctly decoded and one of the frames F1 907(1) has been chosen for outer decoding. With the absence of the second frame F1, frame F2 907(3) shown in the right-hand representation of the receive buffer is now correctly positioned in receive buffer 910 as frame F2 907(2).

With knowledge of the time-alignment of the transmissions, the subscriber station can also determine clipped frames. The subscriber station can identify the clipped frames as erasure frames.

The right-hand representation of the receive buffer shown in FIG. 9 illustrates the clipped frame F3 907(3) identified as an erasure frame in the correct position in the receive buffer 910. To correct for the clipped frame F3 907(3), the subscriber station can outer decode the received first set of inner-coded and outer-coded frames F1 907(1) and the received second set of inner-coded and outer-coded frames F2 907(2) and F4 907(4). For ease of illustration, parity bits, or the redundant part of the receive buffer, are not shown.

One skilled in the art will appreciate that although the flowchart diagrams are drawn in sequential order for comprehension, certain steps can be carried out in parallel in an actual implementation. Furthermore, unless indicate otherwise, method steps can me interchanged without departing form the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method of receiving information on a channel by a subscriber station, the method comprising:
   receiving a first set of frames of a first transmit buffer transmitted on the channel from a first cell, wherein the first set of frames includes a first portion of the information, and each frame of the first set of frames has been inner coded and outer coded;
   receiving a second set of frames of a second transmit buffer transmitted on the channel from a second cell, wherein the second set of frames includes a second portion of the information, and each frame of the second set of frames has been inner coded and outer coded in the same manner as the first set of frames; and
   determining duplicated frames of the received first set of frames and the received second set of frames according to an indication of a time-alignment of the first set of frames and the second set of frames.

2. The method of claim 1, further comprising:
   performing a handoff from the first cell to the second cell.

3. The method of claim 1, further comprising:

receiving the indication of the time-alignment of the first set of frames and the second set of frames.

4. The method of claim 3, wherein receiving the indication of the time-alignment of the first set of frames and the second set of frames comprises receiving an indication of the beginning of the transmission of a first frame of the second transmit buffer transmitted on the channel from the second cell.

5. The method of claim 4, wherein the indication of the beginning of the transmission of the first frame of the second transmit buffer transmitted on the channel of the second cell comprises a system frame number transmitted on a control channel from the second cell.

6. The method of claim 4 wherein the indication of the transmission of the beginning of the first frame of the second transmit buffer transmitted on the channel of the second cell comprises system time of the second cell transmitted on a control channel of the second cell.

7. The method of claim 1 further comprising:
 inner decoding the received first set of frames and the received second set of frames;
 determining if any one of the determined duplicated frames has been correctly inner decoded;
 when any one of the determined duplicated frames has been correctly inner decoded, choosing a one of the correctly inner decoded duplicated frames for outer decoding;
 when none of the determined duplicated frames have been correctly inner decoded, identifying the duplicate frames as an erasure frame; and
 outer decoding the received first set of frames and the received second set of frames to correct the erasure frames.

8. A subscriber station for receiving information on a channel transmitted by a first cell and a second cell, the apparatus comprising:
 a radio unit configured to receive a first set of frames of a first transmit buffer transmitted on the channel from a first cell, wherein the first set of frames includes a first portion of the content, and each frame of the first set of frames has been inner coded and outer coded;
 the radio unit further configured to receive a second set of frames of a second transmit buffer transmitted on the channel from the second cell, wherein the second set of frames includes a second portion of the content, and each frame of the second set of frames has been inner coded and outer coded in the same manner as the first set of frames; and
 a processing unit for determining duplicated frames of the received first set of frames and the received second set of frames according to an indication of a time-alignment of the first set of frames and the second set of frames.

9. The subscriber station of claim 8, wherein the indication of the time-alignment of the first set of frames and the second set of frames comprises an indication of the beginning of the transmission of a first frame of the second transmit buffer transmitted on a channel from the second cell.

10. The subscriber station of claim 9, wherein the indication of the beginning of the transmission of the first frame of the second transmit buffer transmitted on the channel of the second cell comprises a system frame number transmitted on a control channel from the second cell.

11. The subscriber station of claim 9, wherein the indication of the transmission of the beginning of the first frame of the second transmit buffer transmitted on the channel of the second cell comprises system time of the second cell transmitted on a control channel from the second cell.

12. The subscriber station of claim 8, wherein the processing unit is further configured to inner decode the received first set of frames and the received second set of frames, determine if any one of the determined duplicated frames has been correctly inner decoded, choose a one of the correctly inner decoded duplicated frames for outer decoding when any one of the determined duplicated frames has been correctly inner decoded, and identify the duplicate frames as an erasure frame when none of the determined duplicated frames have been correctly inner decoded, and outer decode the received first set of frames and the received second set of frames to correct the erasure frames.

13. An apparatus for receiving information on a channel by a subscriber station, comprising:
 means for receiving a first set of frames of a first transmit buffer transmitted on the channel from a first cell, wherein the first set of frames includes a first portion of the information, and each frame of the first set of frames has been inner coded and outer coded;
 means for receiving a second set of frames of a second transmit buffer transmitted on the channel from a second cell, wherein the second set of frames includes a second portion of the information, and each frame of the second set of frames has been inner coded and outer coded in the same manner as the first set of frames; and
 means for determining duplicated frames of the received first set of frames and the received second set of frames according to an indication of a time-alignment of the first set of frames and the second set of frames.

14. The apparatus of claim 13, further comprising:
 means for performing a handoff from the first cell to a second cell.

15. The apparatus of claim 13, further comprising:
 means for receiving the indication of the time-alignment of the first set of frames and the second set of frames.

16. The apparatus of claim 15, wherein the means for receiving the indication of the time-alignment of the first set of frames and the second set of frames comprises means for receiving an indication of the beginning of the transmission of a first frame of the second transmit buffer transmitted on the channel from the second cell.

17. The apparatus of claim 16, wherein the indication of the beginning of the transmission of the first frame of the second transmit buffer transmitted on the channel of the second cell comprises a system frame number transmitted on a control channel from the second cell.

18. The apparatus of claim 16 wherein the indication of the transmission of the beginning of the first frame of the second transmit buffer transmitted on the channel of the second cell comprises system time of the second cell transmitted on a control channel of the second cell.

19. The apparatus of claim 13 further comprising:
 means for inner decoding the received first set of frames and the received second set of frames;
 means for determining if any one of the determined duplicated frames has been correctly inner decoded;
 when any one of the determined duplicated frames has been correctly inner decoded, means for choosing a one of the correctly inner decoded duplicated frames for outer decoding;
 when none of the determined duplicated frames have been correctly inner decoded, means for identifying the duplicate frames as an erasure frame; and
 means for outer decoding the received first set of frames and the received second set of frames to correct the erasure frames.

20. A computer-readable medium including computer-executable instructions encoded thereon for performing a method of receiving information on a channel by a subscriber station, the method comprising the steps of:

receiving a first set of frames of a first transmit buffer transmitted on the channel from a first cell, wherein the first set of frames includes a first portion of the information, and each frame of the first set of frames has been inner coded and outer coded;

receiving a second set of frames of a second transmit buffer transmitted on the channel from a second cell, wherein the second set of frames includes a second portion of the information, and each frame of the second set of frames has been inner coded and outer coded in the same manner as the first set of frames; and determining duplicated frames of the received first set of frames and the received second set of frames according to an indication of a time-alignment of the first set of frames and the second set of frames.

* * * * *